United States Patent
Hammett et al.

(10) Patent No.: US 10,440,540 B2
(45) Date of Patent: Oct. 8, 2019

(54) METHOD AND SYSTEM FOR WIRELESS COMMUNICATION IN A LIGHTING APPLICATION

(71) Applicants: Geoffrey Granville Hammett, Norcross, GA (US); Barry Edward Martin, Peachtree City, GA (US)

(72) Inventors: Geoffrey Granville Hammett, Norcross, GA (US); Barry Edward Martin, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 443 days.

(21) Appl. No.: 14/724,570

(22) Filed: May 28, 2015

(65) Prior Publication Data

US 2015/0350818 A1 Dec. 3, 2015

Related U.S. Application Data (60) Provisional application No. 62/005,788, filed on May 30, 2014.

(51) Int. Cl.

| | |
|---|---|
| *H04W 4/00* | (2018.01) |
| *H04W 4/80* | (2018.01) |
| *G05B 15/02* | (2006.01) |
| *H05B 37/02* | (2006.01) |
| *H04L 12/28* | (2006.01) |
| *H04W 52/02* | (2009.01) |

(52) U.S. Cl.
CPC ............. *H04W 4/80* (2018.02); *G05B 15/02* (2013.01); *H04L 12/2816* (2013.01); *H04W 52/0251* (2013.01); *H05B 37/0272* (2013.01); *Y02D 70/142* (2018.01); *Y02D 70/144* (2018.01)

(58) Field of Classification Search
CPC ................................. G05B 15/02; Y02B 60/50
USPC ......................................................... 700/275
See application file for complete search history.

(56) References Cited

U.S. PATENT DOCUMENTS

| 5,854,588 A * | 12/1998 | Dockery ................ G08B 13/19 340/539.1 |
| 2009/0231136 A1* | 9/2009 | Sugla ................. G06K 7/10079 340/572.1 |

(Continued)

OTHER PUBLICATIONS

Jorgensen et al., "Control the home with a wireless network" Zensys A/S, EDN, Wireless Net DesignLine, Aug. 2, 2005, 14 Pgs (accessed at https://www.edn.com/design/other/4012578/Control-the-home-with-a-wireless-network (Year: 2005).*

(Continued)

*Primary Examiner* — Emilio J Saavedra
(74) *Attorney, Agent, or Firm* — King & Spalding LLP (57) ABSTRACT

Devices associated with a lighting application can utilize multiple communication technologies for communicating with multiple devices that have different power consumption constraints and different transmission ranges. Communications and signaling can be managed to extend battery life. A battery-powered occupancy sensor can communicate occupancy information via a radio. The radio can be placed in sleep mode to preserve battery life. A communication node in the application can support intra-network and inter-network communications, for example with remote devices and systems.

18 Claims, 6 Drawing Sheets

(56) References Cited

U.S. PATENT DOCUMENTS

| | | | |
|---|---|---|---|
| 2010/0052574 A1* | 3/2010 | Blakeley | G08B 13/191 |
| | | | 315/307 |
| 2010/0052894 A1* | 3/2010 | Steiner | G08B 29/24 |
| | | | 340/539.1 |
| 2012/0136485 A1* | 5/2012 | Weber | G05B 15/02 |
| | | | 700/275 |
| 2014/0056286 A1 | 2/2014 | Nagata | |
| 2014/0068303 A1 | 3/2014 | Hildebrand et al. | |

OTHER PUBLICATIONS

International Search Report for PCT/US2015/033021, dated Aug. 20, 2015.

* cited by examiner

METHOD AND SYSTEM FOR WIRELESS COMMUNICATION IN A LIGHTING APPLICATION

CROSS REFERENCE TO RELATED APPLICATIONS

This application claims priority to U.S. Provisional Patent Application No. 62/005,788 filed May 30, 2014 in the name of Geoffrey Granville Hammett and Barry Edward Martin and entitled "Method and System for Wireless Communication in a Lighting Application," the entire contents of which are hereby incorporated herein by reference.

TECHNICAL FIELD

Embodiments of the technology relate generally to communicating and signaling in an illumination system, and more particularly to managing communications and signaling to extend life of batteries in the system and provide network interoperability.

BACKGROUND

Conventional communication systems have limitations with respect to energy consumption, data rate, range, and network interoperability. Need exists for technology that can extend battery life in an illumination environment. Further need exists for technology that can improve communication data rate in an illumination environment. Further need exists for technology that can improve communication range in an illumination environment. Further need exists for technology that can improve network interoperability in an illumination environment. A capability addressing such a need, or another related deficiency in the art, would improve lighting and/or communications, including from economic, usability, and energy perspectives.

SUMMARY

In one aspect of the disclosure, devices associated with a lighting application can utilize a combination of communication technologies for communicating with multiple devices that have different power consumption constraints and different transmission ranges. Communications and signaling can be managed to extend battery life in one or more of the devices.

In one aspect of the disclosure, a battery-powered sensor can communicate occupancy information via a radio. The radio can be placed in sleep mode to preserve battery life. The radio can be awakened at strategic times.

In one aspect of the disclosure, a communication node in a lighting application can support communications among multiple devices in the lighting application. The communication node can further provide a path to remote devices and broader networks, for example supporting Internet connectivity.

In one aspect of the disclosure, a system comprises: a sensor for monitoring a space and providing occupancy information; a computer system; a lighting switch; and a radio that is disposed at the lighting switch and that provides a first wireless communication channel to the sensor and a second wireless communication channel to the computer system.

The foregoing discussion of certain aspects of the disclosure is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will be made below to the accompanying drawings.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

Devices associated with lighting applications can utilize a combination of communication technologies for communicating with multiple devices that have different power consumption constraints and different transmission ranges. Communications and signaling can be managed to extend battery life. An element of a lighting system can provide a wireless node that can support intra-network and/or inter-network communications.

Some representative embodiments will be described more fully hereinafter with example reference to the accompanying drawings. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Some of the embodiments may comprise or involve processes that will be discussed below. Certain steps in the processes may need to naturally precede others to achieve intended functionality. However, the technology is not limited to the order of the steps described to the extent that such reordering or re-sequencing does not render the process useless or nonsensical. Thus, it is recognized that some steps may be performed before or after other steps or in parallel with other steps without departing from the scope and spirit of this disclosure.

As discussed in further detail below, performance or operations of a computer-based system can be improved or enhanced, for example via extending battery life and/or via more efficient network management or communication channel utilization.

Figure 1:
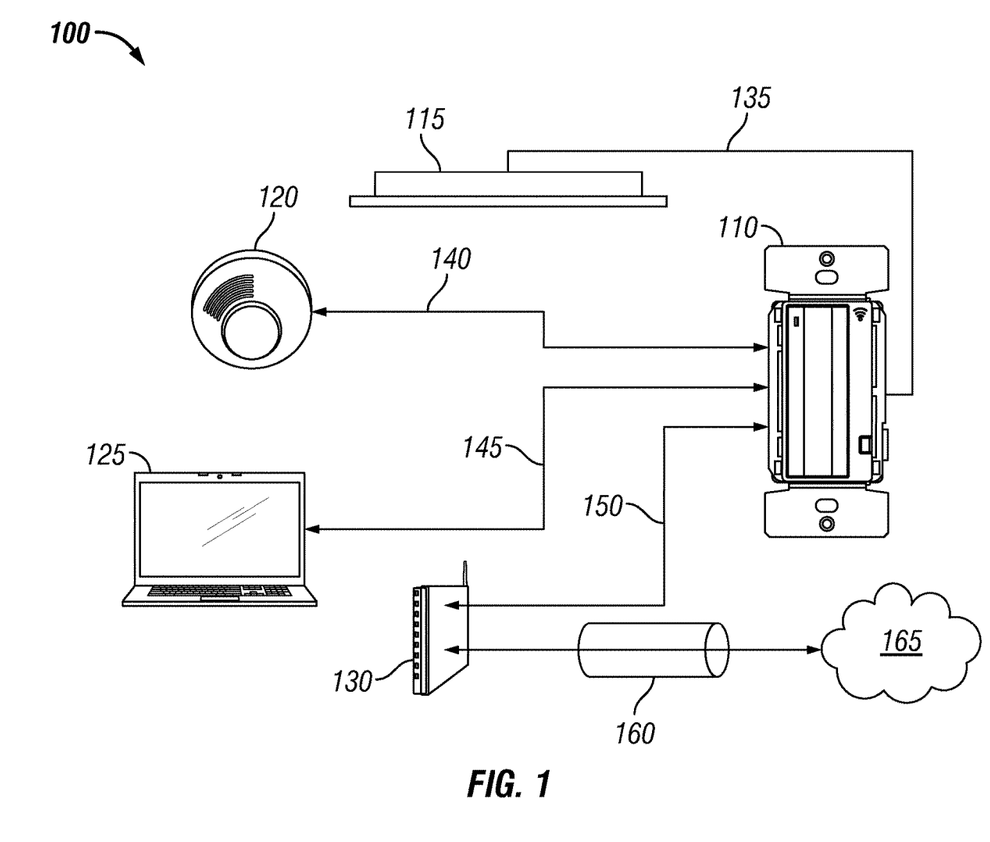
FIG. 1 is a diagram of a system that supports integrated wireless control, electrical load management, and networking in accordance with some example embodiments of the disclosure.

Turning now to FIG. 1, this figure illustrates a diagram of an example system 100 that supports integrated wireless control, electrical load management, and networking according to some embodiments of the disclosure.

In the illustrated example embodiment, the system 100 comprises a control device 110, a lighting fixture 115, a sensor 120, a computing system 125, and a gateway 130. An electrical circuit 135 extends between the control device 110 and the lighting fixture 115. A communication channel 140 supports communication between the sensor 120 and the control device 110. A communication channel 145 supports communication between the control device 110 and the computing system 125. A communication channel 150 supports communication between the control device 110 and the gateway 130. A communication channel 160 supports communication between the gateway 130 and a computing network 165.

In various example embodiments, the control device 110 can comprise an on-off wall switch, a dimmer wall switch, an electrical receptacle, an exit sign, a junction box, or some other appropriate device that may be powered by line voltage, by battery, or by a combination of battery and line voltage. As will be discussed in further detail below, the control device 110 supports wireless communication with one or more instances of the sensor 120, the computing system 125, and the gateway 130. Accordingly, embodiments of the control device 110 can comprise one or more antennas and associated radios that comprise wireless transmitters and receivers.

In various example embodiments, the lighting fixture 115 can comprise an indoor or an outdoor luminaire and can generate light using light emitting diodes, fluorescent tubes, high energy discharge (HID) systems, incandescent lamps, or some other appropriate technology. The lighting fixture 115 can be mounted to a ceiling or other overhead structure, to a wall or other vertical structure, or to a pole or other freestanding structure. The lighting fixture 115 can comprise a suspended lighting fixture, a recessed lighting fixture, or a streetlight, to mention a few representative examples without limitation. In some embodiments, the lighting fixture 115 can comprise a portable lighting device.

In the illustrated embodiment, the lighting fixture 115 is powered by line electricity, but may alternatively receive power from a battery or another energy source. The control device 110 can control light output from the lighting fixture 115 by manipulating the supplied power. For example, in some embodiments, the control device 110 interrupts or varies the amount of electricity flowing to the lighting fixture 115. In some embodiments, the control device 110 sends wired or wireless command signals to the lighting fixture 115, and the lighting fixture adjusts light output according to those commands. The commands can come from manual user input at the control device 110 or may be delivered to the control device 110 from a remote user or from a remote light management computer program.

In various example embodiments, the sensor 120 can comprise an occupancy sensor, a daylight sensor, a light-level sensor, a smoke detector, a motion detector, or another appropriate sensing device. In some example embodiments, the sensor 120 comprises an array of sensors. In some example embodiments, the sensor 120 comprises a passive infrared sensor. As will be discussed in further detail below, the sensor 120 has a wireless communication capability for communicating with the control device 110 via the communication channel 140. The sensor 120 may be battery powered while having a long battery life.

In various example embodiments, the computing system 125 can comprise one or more personal computers, laptops, tablets, or other computer-based devices. In some embodiments, the computing system 125 comprises a local area network (LAN) of computers and associated infrastructure. The computing system 125 can interface wirelessly with the control device 110 over the communication channel 145. As will be discussed in further detail below, connectivity to the control device 110 supports remote and local communication to various systems, including to the sensor 120, to the lighting fixture 115, to other computing systems, to the gateway 130, and to the distributed computing network 165, for example.

The gateway 130 can comprise a system that joins together two networks that utilize different protocols. In various embodiments, the gateway 130 can be implemented completely in hardware, completely in software, or in a combination of hardware and software. In some example embodiments, the gateway 130 can comprise a wireless or a wired router or a wireless or a wired modem. The gateway 130 may be based on various technologies, such as ISDN, xDSL, or cable, to mention a few representative examples without limitation.

In one example embodiment, the distributed computing network 165 comprises the Internet. In some example embodiments, the distributed computing network 165 comprises a packet-switched network other than the Internet. In some example embodiments, the distributed computing network 165 comprises an intranet. In some example embodiments, the distributed computing network 165 comprises an extranet. In some example embodiments, the distributed computing network 165 comprises a private network.

Accordingly, the system 100 can provide users and devices with Wi-Fi-based access to various data and communication networks, including LANs, corporate networks, intranets, the Internet, facility-wide energy management systems, and facility-wide lighting management systems, to mention some representative examples without limitation. Moreover, the system 100 can collect usage and/or consumption information and control a network of lighting fixtures 115 distributed across a building, campus, or other facility, property, or region for example.

In an example embodiment, the communication channel 140 between the sensor 120 and the control device 110 utilizes low-power short-range wireless communication. For example, the communication channel 140 can be based on low power physical layer/media access control/protocol (low power Phy/MAC/Protocol), such as the communication protocol known in the industry under the identifier BLUETOOTH Low Energy (BLE). Utilizing low-power communication can facilitate long battery life of battery-powered embodiments of the sensor 120.

In an example embodiment, the communication channel 145 between the control device 110 and the computing system 125 utilizes Wi-Fi Phy/MAC/Protocol, for example in accordance with the standards known as IEEE 802.11b/g/n/ac. Via this communication channel 145, the control device 110 can provide the computing system 125 with a bridge to other computing systems, a LAN, a corporate network, the Internet, and/or various other networked resources, for example.

In an example embodiment, the communication channel 150 between the control device 110 and the gateway 130 utilizes Wi-Fi Phy/MAC/Protocol, for example in accordance with the standards known as IEEE 802.11b/g/n/ac. Via this communication channel 150, the control device 110 can access resources on other networks, such as the Internet, via the gateway 130. Further, the control device 110 can provide the sensor 120, the computing system 125, and other networked devices with communication to remote systems.

In an example embodiment, the communication channel 160 between the gateway 130 and the computing network 165 comprises a broadband pipe that supports Internet access. The communication channel 160 can comprise one or more fiber optic cables, satellites, copper wires, cellular communication networks, or other appropriate communication systems, for example.

Accordingly, in the illustrated embodiment, the system 100 provides a hybrid radio architecture that supports communications among wirelessly connected devices using either low-power PHY/MAC/Protocol, such as the protocol known in the industry under the identifier BLUETOOTH LE/BLUETOOTH 4.0 for local battery-powered devices or IEEE 802.11 PHY/MAC/Protocol for longer range communication with other devices. Further, the hybrid communication architecture can support the protocol known in the industry under the identifier BLUETOOTH LE (BLUETOOTH Low Energy, BLUETOOTH Smart, BLUETOOTH 4.0) PHY/MAC/Protocol and IEEE 802.11b/g PHY/MAC/Protocol over different communication channels, in either concurrent or time division multiplexed mode.

Figure 2:
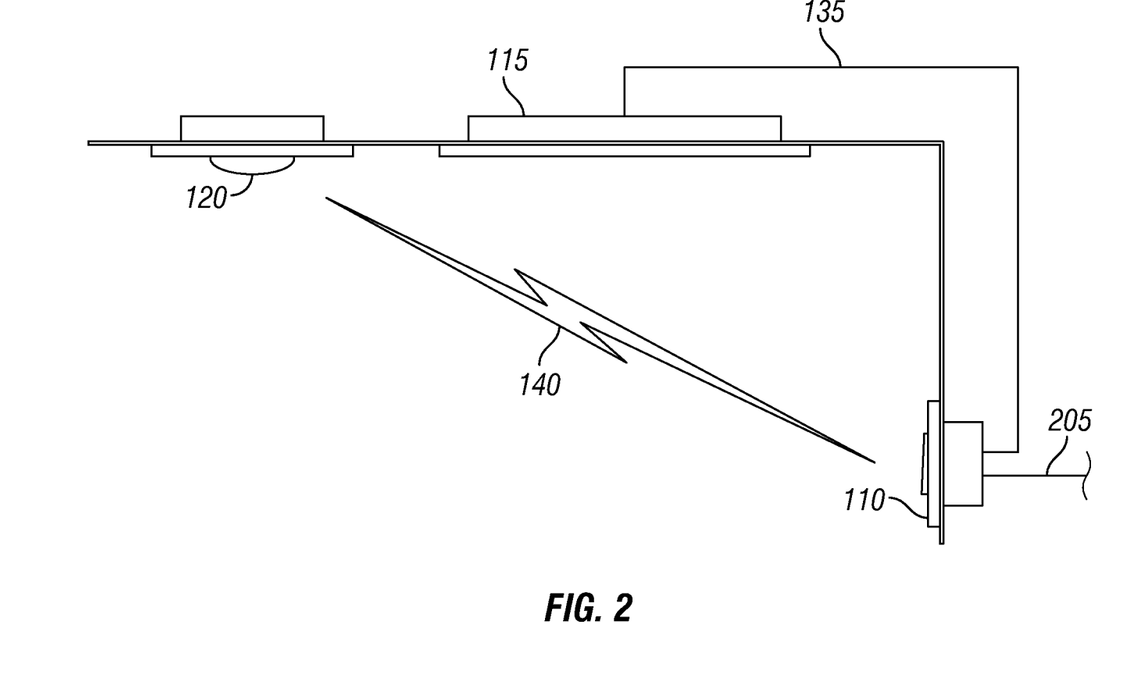
FIG. 2 is a diagram describing a portion of the system illustrated in FIG. 1 that comprises a sensor, a control device, and a lighting fixture in accordance with some example embodiments of the disclosure.

Turning now to FIG. 2, this figure is a diagram describing an example portion of the system 100 illustrated in FIG. 1, wherein the diagram illustrates examples of the sensor 120, the control device 110, and lighting fixture 115 according to some embodiments of the disclosure.

In this example, the control device 110 comprises a wall-mounted dimmer switch through which a user can adjust the level of light emitted from the lighting fixture 115, which is illustrated as ceiling mounted. Electrical power, for example 110/277 volts alternating current (AC) comes into the control device 110 via the electrical supply line 205 and flows to the lighting fixture 115 via the electrical circuit 135.

In the illustrated example configuration, the sensor 120 is battery powered and is also ceiling mounted. The communication channel 140 between the sensor 120 and the control device 110 operates at 2.4 gigahertz (GHz) with low power consumption to extend battery life at the sensor 120.

In an example embodiment, the sensor 120 comprises an occupancy sensor that transmits occupancy information to the control device 110. The control device 110 can autonomously adjust light level output by the lighting fixture 115 according to the received information. Additionally, the control device 110 can distributed the occupancy information to other devices to which the control device 110 is connected as discussed above. For example, the control device 110 can send occupancy information to a system or network that manages energy utilization or lighting on a facilities-wide or corporate-wide level.

Additionally, in some embodiments, commands for light-level adjustments are generated remotely but based on occupancy information produced by the sensor 120 and by other similar sensors located at other areas of a facility. Accordingly, the lighting fixture 115 can be controlled based on local occupancy information, based on remote occupancy information, or based on computer logic that takes into account occupancy information aggregated from a network of sensors distributed throughout a building or a geographic region.

Figure 3A:
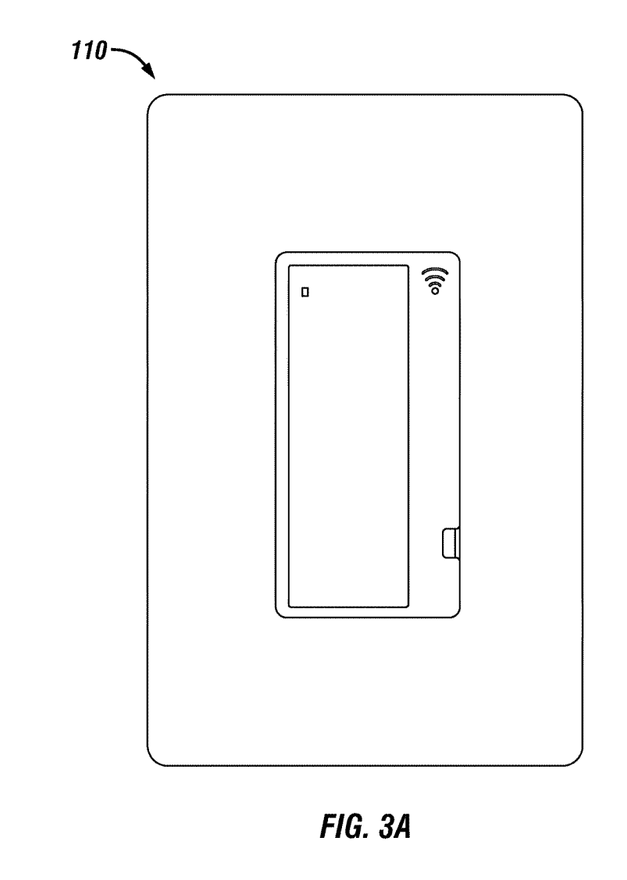
FIGS. 3A and 3B (collectively FIG. 3) are illustrations of the control device illustrated in FIGS. 1 and 2 in accordance with some example embodiments of the disclosure.
Figure 3B:
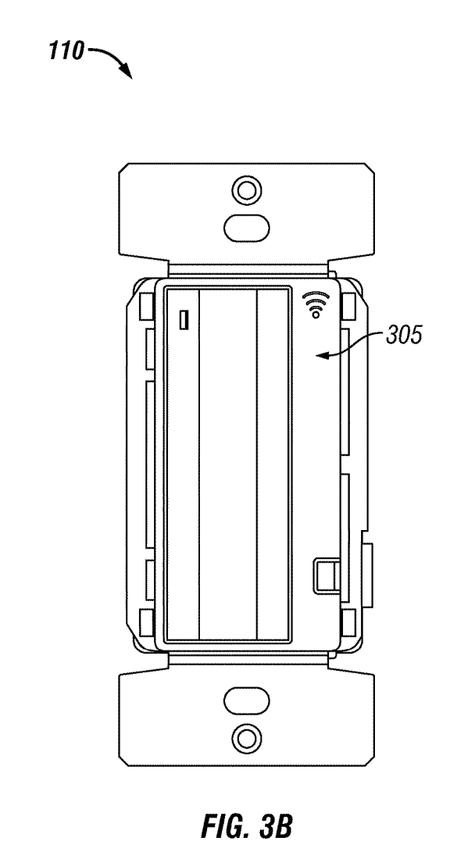

Turning FIG. 3, this figure illustrates an example of the control device 110 illustrated in FIGS. 1 and 2 according to some embodiments of the disclosure. More specifically, FIG. 3 illustrates the dimmer switch example embodiment of the control device 110 discussed above with reference to FIG. 2. FIG. 3A illustrates a front view, while FIG. 3B illustrates a rear view showing the switch box 305 that is wall recessed when mounted.

Figure 4:
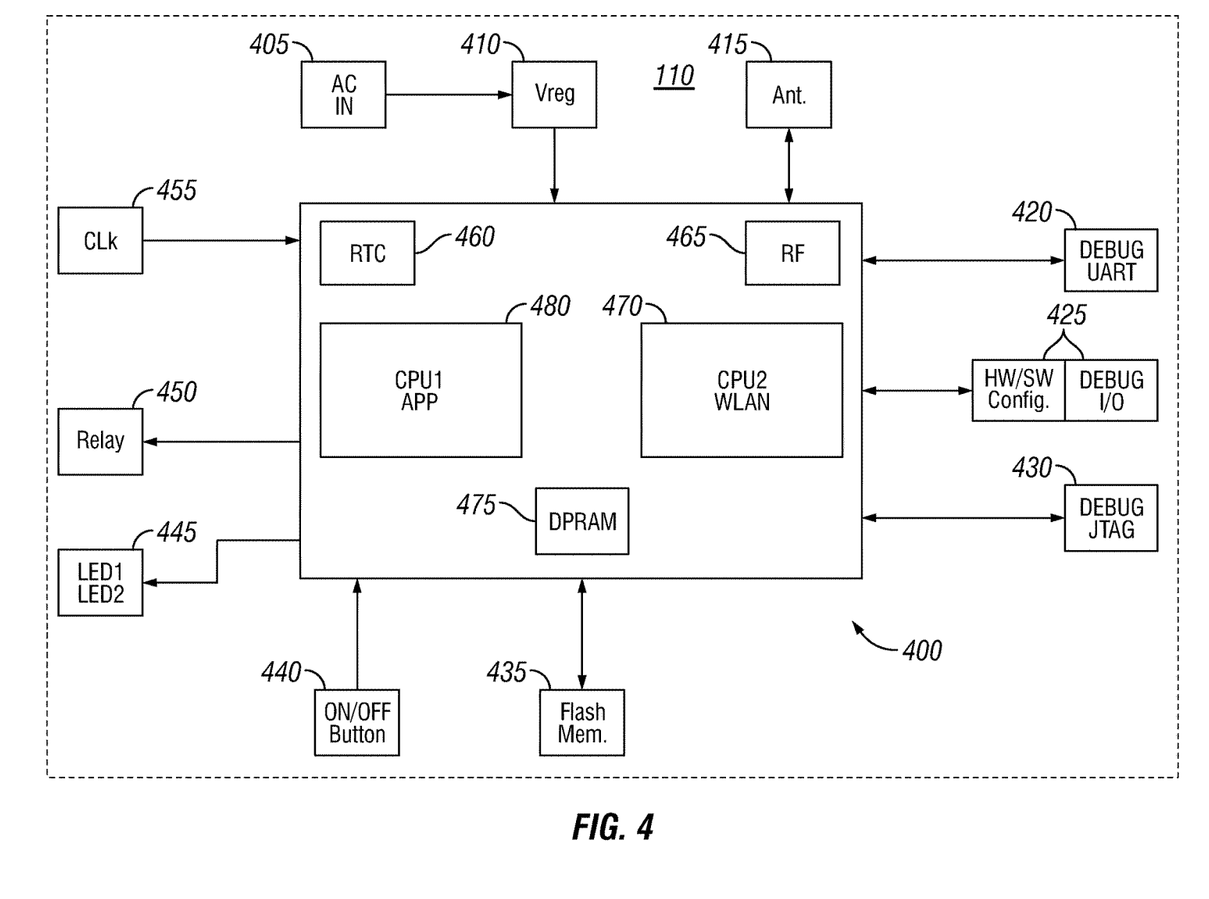
FIG. 4 is a block diagram of the control device illustrated in FIG. 3 in accordance with some example embodiments of the disclosure.

Turning now to FIG. 4, this figure is an example block diagram of the control device 110 illustrated in FIG. 3 according to some embodiments of the disclosure. More specifically, the block diagram illustrates a representative microprocessor-based system 400 in the control device 110.

In the illustrated example embodiment, the system 400 comprises an application central processing unit (CPU) 480 and a wireless local area network CPU 470, with associated dual port random access memory 475 and flash memory 435. A real-time clock 460 is connected to another clock 455 and supports timing functions. An AC power input 405 feeds a voltage regulator 410 and is fed by an electrical supply line 205 (illustrated at FIG. 2). A radio 465 sends and receives information via an antenna 415. LEDs 445 can function as indicators. The system 400 can open or close a relay 450 for controlling electrical flow to a device or for sending information via electrical pulses. Debugging interfaces include a universal asynchronous receiver/transmitter interface 420, a joint test action group interface 430, and a hardware/software configuration interface 425. An on-off button 440 is also provided.

Figure 5:
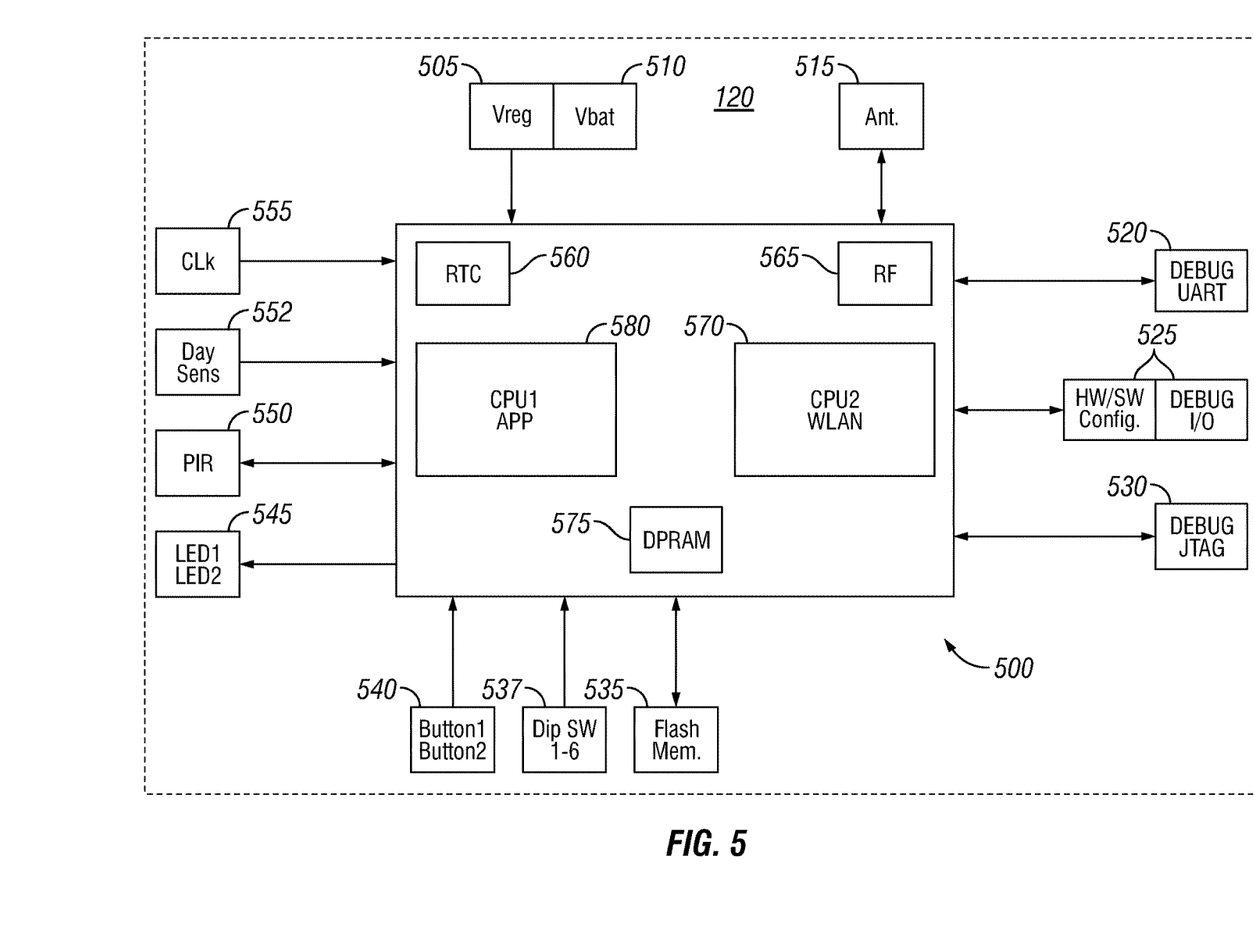
FIG. 5 is a block diagram of the sensor illustrated in FIGS. 1 and 2 in accordance with some example embodiments of the disclosure.

Turning now to FIG. 5, this figure is an example block diagram of the sensor 120 illustrated in FIGS. 1 and 2 according to some embodiments of the disclosure. More specifically, the block diagram illustrates a representative microprocessor-based system 500 in the sensor device 120.

In the illustrated example embodiment, the system 500 comprises an application CPU 580 and a wireless local area network CPU 570, with associated dual port random access memory (DPRAM) 575 and flash memory 535. A real-time clock 560 is connected to another clock 555 and supports timing functions. A battery 510 supplies power through a voltage regulator 505. A radio 565 sends and receives information via an antenna 515. LEDs 545 can function as indicators. A passive infrared sensor 550 functions as an occupancy sensor for a monitored space. A daylight sensor 552 provides light level of the monitored space. Debugging interfaces include a universal asynchronous receiver/transmitter interface 520, a joint test action group interface 530, and a hardware/software configuration interface 525. Six DIP switches 537 and a two-state button 540 are also provided.

Referring now to FIGS. 4 and 5, with additional reference to the preceding figures, representative processes will be discussed in further detail. In the following discussion, the example of the occupancy sensor embodiment of the sensor 120 and the dimmer switch embodiment of the control device 110 will be utilized without suggesting any limitations to such embodiments.

In operation, when the sensor 120 detects occupancy of a vacant space (for example a room), the sensor 120 sends an occupied message to the control device 110. In some embodiments, the occupied message can be interpreted as an instruction to turn on the lighting fixture 115.

The default state of the transmit/receive radio 565 of the sensor 120 is sleep mode. The radio 565 wakes up to transmit vacancy information when two conditions are met concurrently: 1) a change in the occupancy state of the room is detected; and 2) a delay time setting (discussed below) is reached. During other times, the radio 565 remains in sleep mode to preserve battery power, and the sensor 120 wakes up to send data at strategic times when deemed necessary.

In an example embodiment, the transmit/receive radio 565 can implement fast response wake from the sleep mode. In some example embodiments, the radio 565 implements link quality power adaption using signal strength power management to reduce power consumption when signal strength is high. For example, the power management can result in a ten-year life for the battery 510 of the sensor 120.

The time clock 560 of the sensor 120 and the time clock 460 of the control device 110 are synchronized to facilitate coordinated actions and time delay. Accordingly, the sensor 120 and the control device 110 can both know and track time delay. Delay time is the amount of time that the sensor 120 and the control device 110 leave the lighting fixture 115 on after the monitored space (e.g. room) becomes vacant.

The control device 110 monitors information from the sensor 120 (and can likewise monitor information from other sensors that may provide occupancy information or other information). The control device 110 further maintains occupancy state of the monitored space. Accordingly, the control device 110 can manage and control lighting without continuous radio contact with the sensor 120. For example, the control device 110 can turn lights on when an occupied signal is received from the sensor 120 (or from another associated sensor). The control device 110 can similarly turn lights off when a vacancy signal is received from the sensor 120 (or from another associated sensor).

In some example embodiments, the memory 535 stores instructions for computer-based execution of a process that comprises: placing the radio 565 in a sleep mode; maintaining the radio 565 in the sleep mode while occupancy information indicates that the monitored space is occupied; in response to the occupancy information indicating that the monitored space has changed from occupied to unoccupied, clocking time that the monitored space is unoccupied while maintaining the radio 565 in the sleep mode; comparing the clocked time to a threshold while maintaining the radio 565 in the sleep mode; and waking the radio 565 from the sleep mode in response to the clocked time meeting the threshold. In some embodiments, such a process can be executed through or in collaboration with the control device 110.

In some example embodiments, the memory 535 stores instructions for computer-based execution of a process that comprises: placing the radio 565 in a sleep mode; maintaining the radio 565 in the sleep mode while occupancy information indicates that the monitored space is unoccupied; in response to the occupancy information indicating that the monitored space has changed from unoccupied to occupied, clocking time that the monitored space is occupied while maintaining the radio 565 in the sleep mode; comparing the clocked time to a threshold while maintaining the radio 565 in the sleep mode; and waking the radio 565 from the sleep mode in response to the clocked time meeting the threshold. In some embodiments, such a process can be executed through or in collaboration with the control device 110.

In some example embodiments, the memory 535 stores instructions for computer-based execution of a process that comprises: determining whether a space is in first occupancy state or a second occupancy state based on input from an occupancy sensor; maintaining a battery-powered radio 565 in a first mode while the space is determined to be in the first occupancy state; maintaining the battery-powered radio 565 in the first mode while making a determination that the space has changed from the first occupancy state to the second occupancy state; maintaining the battery-powered radio 565 in the first mode while determining whether the second occupancy state persists for a threshold amount of time; and changing the battery-powered radio 565 from the first mode to the second mode in response to a determination that the second occupancy state has persisted for the threshold amount of time. In some embodiments, such a process can be executed through or in collaboration with the control device 110.

In some example embodiments, the first mode comprises a sleep mode, the second mode comprises an active mode, the first occupancy state comprises occupied, and the second occupancy state comprises unoccupied. In some example embodiments, the first mode comprises a sleep mode, the second mode comprises an active mode, the first occupancy state comprises unoccupied, and the second occupancy state comprises occupied.

Figure 6:
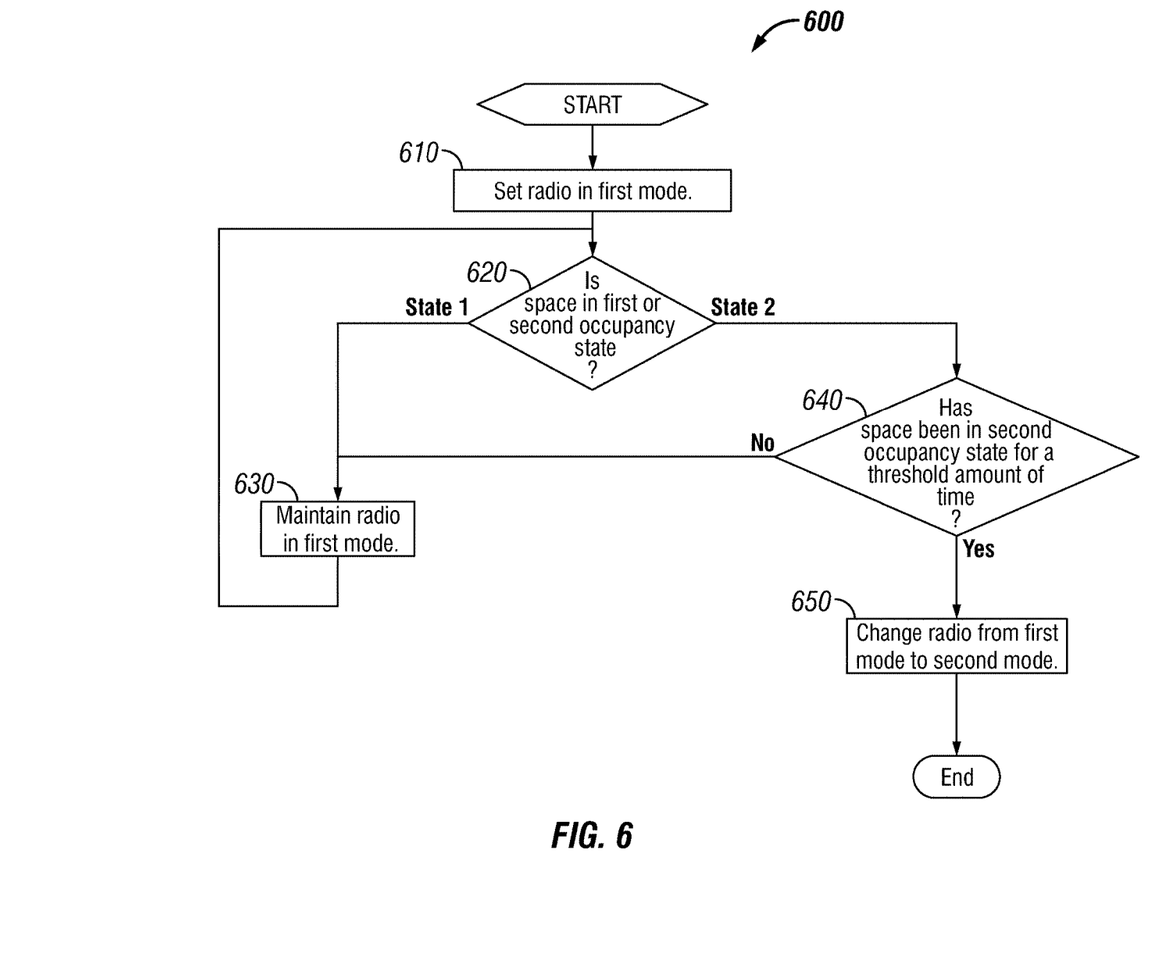
FIG. 6 is a flowchart of a process for managing a battery-powered radio based on occupancy state of a space in accordance with some example embodiments of the disclosure.

Turning now to FIG. 6, this figure illustrates a flowchart of an example process 600 for managing a battery-powered radio 565 based on occupancy state of a space according to some embodiments of the disclosure. Process 600 can be practiced via computer-based execution of instructions stored in the memory 535, for example. In some embodiments, the application CPU 580 of the sensor 120 can execute the stored instructions, for example.

At block 610 of process 600, the radio 565 of the sensor 120 is set to a first mode. In one embodiment, the first mode is a sleep mode. In another embodiment, the first mode comprises an active or awake mode.

At inquiry block 620 of process 600, the sensor 120 determines whether the space (for example a room or other area) is in a first occupancy state or a second occupancy state. For example, the sensor 120 may determine whether the space is occupied or unoccupied. The first state can be occupied, and the second state unoccupied, or vice versa, for example.

If the sensor 120 determines that the space is in the first occupancy state, then execution of process 600 branches to block 630. At block 630, the sensor 120 maintains the radio 565 in the first mode. In one embodiment, if the space is unoccupied, then the radio 565 is maintained in a sleep mode. In another embodiment, if the space is occupied, then the radio is maintained in a sleep mode.

From block 630, process 600 loops back to inquiry block 620 and iterates until the sensor 120 detects the second occupancy state. When the sensor determines that the space is in the second occupancy state, execution of process 600 proceeds from inquiry block 620 to inquiry block 640.

At inquiry block 640 the sensor 120 determines the length of time that the space has been in the second occupancy state. For example, the sensor 120 can initiate a timer as soon as the sensor 120 detects a transition from the first occupancy state to the second occupancy state. If the space has not been in the second occupancy state for a specified amount of time, then process 600 branches from inquiry block 640 to block 630.

If, on the other hand, the space has been in the second occupancy state for the specified length of time, then process 600 executes block 650 from block 640. At block 650, the sensor 120 changes the radio 565 from the first mode to the second mode. In the embodiment illustrated in flowchart form in FIG. 6, process 600 ends following execution of block 650. The radio 565 may be awakened or activated at block 650, for example.

In one example embodiment of process 600, the sensor 120 places the radio 565 in sleep mode at block 610. The sensor 120 maintains the radio 565 in sleep mode while the monitored space is occupied to conserve energy. When the sensor detects that the monitored space has changed from an occupied state to an unoccupied state, the sensor 120 clocks time that the monitored space is unoccupied and maintains the radio 565 in the sleep mode to conserve energy. When the clocked time reaches a threshold level, the sensor 120 wakes the radio 565 from the sleep mode.

In one example embodiment of process 600, the sensor 120 places the radio 565 in sleep mode at block 610. The sensor 120 maintains the radio 565 in sleep mode while the monitored space is unoccupied to conserve energy. When the sensor detects that the monitored space has changed from an unoccupied state to an occupied state, the sensor 120 clocks time that the monitored space is occupied and maintains the radio 565 in the sleep mode to conserve energy. When the clocked time reaches a threshold level, the sensor 120 wakes the radio 565 from the sleep mode.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system comprising:
    a control device that comprises a first radio that is associated with a first wireless communication technology and a second radio that is associated with a second wireless communication technology that is different from the first wireless communication technology, the control device being disposed in a space and being electrically coupled to a lighting fixture that is configured to illuminate the space;
    a remotely located control system that is configured to monitor and manage the lighting fixture in the space via the control device, the remotely located control system being communicatively coupled to the control device via a distributed computing network, wherein the control device is configured to communicate with the remotely located control system through the distributed computing network using the first radio of the control device;
    a sensor unit that is configured to monitor the space that is illuminated by the lighting fixture, wherein the control device is configured to communicate with the sensor unit via the second radio of the control device, and wherein the sensor unit comprises:
        a sensor;
        a third radio that is associated with the second wireless communication technology;
        a processor that is coupled to the sensor and the third radio; and
        processor executable instructions stored in a memory of the sensor unit for performing the steps of:
            maintaining the third radio in the sleep mode while occupancy information indicates that the space is unoccupied; and
            in response to the occupancy information indicating that the space has changed from unoccupied to occupied:
                clocking time that the space is occupied while maintaining the third radio in the sleep mode; and
                in response to the occupancy information indicating that the space has changed from unoccupied to occupied and in response to the time that the space is occupied meeting a threshold,
                    transmitting, using the third radio, the occupancy information to the control device by waking the third radio from the sleep mode, wherein the control device changes an operational status of the lighting fixture based on the occupancy information.

2. The system of claim 1, wherein the battery, the sensor, the third radio, and the processor are mounted to a common housing,
    wherein the change in the operational status of the lighting fixture comprises switching off the lighting fixture, and
    wherein the second wireless communication technology is a low-power short-range wireless communication technology.

3. The system of claim 1, wherein the first wireless communication technology is Wi-Fi, wherein the second wireless communication technology is Bluetooth Low Energy, wherein the control device is communicatively coupled to a computing system of a local area network, and wherein the control device is configured to communicate with the computing system via the first radio.

4. The system of claim 1, wherein the control device is configured to communicate with the remotely located control system via a gateway.

5. The system of claim 1, wherein the control device comprises a lighting switch.

6. The system of claim 1, wherein the control device comprises a wireless hub integrated into a switch box.

7. A system comprising:
    a battery;
    a sensor for monitoring a space that is configured to be illuminated by a lighting fixture;
    a radio;
    a processor that is powered by the battery and that comprises:
        an input connected to the sensor to receive occupancy information associated with the space; and
        an output connected to the radio;
    memory; and
    processor executable instructions stored in the memory for performing the steps of:
        placing the radio in a sleep mode;
        maintaining the radio in the sleep mode while the occupancy information indicates that the space is unoccupied;
        in response to the occupancy information indicating that the space has changed from unoccupied to occupied, clocking time that the space is occupied while maintaining the radio in the sleep mode;

comparing the clocked time to a threshold while maintaining the radio in the sleep mode; and in response to the occupancy information indicating that the space has changed from unoccupied to occupied and in response to the clocked time meeting the threshold, transmitting, using the radio, the occupancy information to a control device by waking the radio from the sleep mode, wherein the control device controls an operation of the lighting fixture based on the occupancy information.

8. The system of claim 7, wherein the battery, the sensor, the radio, and the processor are mounted to a common housing, and wherein the control device comprises a second radio configured for communicating with the radio over a low-power wireless communication channel.

9. The system of claim 8, wherein the control device further comprises a third radio configured for communicating with a computing system.

10. The system of claim 8, wherein the control device further comprises one or more third radios configured for communicating with a computing system and a gateway.

11. The system of claim 8, wherein the control device comprises a lighting switch.

12. The system of claim 8, wherein the control device comprises a wireless hub integrated into a switch box.

13. A process comprising the steps of:

determining whether a space that is monitored by a sensor is in a first occupancy state or a second occupancy state based on an input from the sensor, wherein the space is configured to be illuminated by a lighting device, and wherein the first occupancy state is an unoccupied state and the second occupancy state is an occupied state;

maintaining a battery-powered radio in a sleep mode while the space is determined to be in the first occupancy state, wherein the battery powered radio is implemented with a link quality power adaptation mechanism that reduces power consumption of the battery-powered radio when the signal strength is high;

maintaining the battery-powered radio in the sleep mode while making a determination that the space has changed from the first occupancy state to the second occupancy state;

maintaining the battery-powered radio in the sleep mode while determining whether the second occupancy state persists for a threshold amount of time; and in response to a determination that the space has changed from the first occupancy state to the second occupancy state and the second occupancy state has persisted for the threshold amount of time, changing the battery-powered radio from the sleep mode to an active mode in which the battery-powered radio transmits information regarding the change of the space from the first occupancy state to the second occupancy state to a control device that controls an operation of the lighting device based on the information, the control device having a time clock that is synchronized with a time clock of the sensor to facilitate coordinated actions and time delay.

14. The process of claim 13, wherein determining whether the second occupancy state persists for the threshold amount of time comprises clocking time at the sensor.

15. The process of claim 14, wherein determining whether the second occupancy state persists for the threshold amount of time comprises clocking time at a lighting switch.

16. The process of claim 13, wherein determining whether the second occupancy state persists for the threshold amount of time comprises:

clocking time using a first clock disposed at the sensor; and clocking time using a second clock disposed at a switch box, and wherein the first clock and the second clock are synchronized.

17. The process of claim 13, wherein the sensor comprises:

the battery-powered radio;

a battery-powered microprocessor system; and a battery, and wherein the sensor is a battery powered passive infrared sensor.

18. The process of claim 13, further comprising the steps of:

wherein the control device comprises a lighting switch that comprises a wireless hub and provides wireless Internet connectivity to a computer disposed in the space.

* * * * *